United States Patent
Stulz (10) Patent No.: US 10,731,765 B2
(45) Date of Patent: Aug. 4, 2020

(54) VALVE ACTUATION DEVICE AND SANITARY RULE

(71) Applicant: Hansgrohe SE, Schiltach (DE)

(72) Inventor: Thomas Stulz, Oberwolfach (DE)

(73) Assignee: Hansgrohe SE, Schiltach (DE)

( * ) Notice: Subject to any disclaimer, the term of this patent is extended or adjusted under 35 U.S.C. 154(b) by 53 days.

(21) Appl. No.: 16/212,397

(22) Filed: Dec. 6, 2018

(65) Prior Publication Data

US 2019/0178398 A1    Jun. 13, 2019

(30) Foreign Application Priority Data

Dec. 7, 2017   (DE) .................. 10 2017 222 196

(51) Int. Cl.
| | | |
|---|---|---|
| *F16K 11/18* | (2006.01) | |
| *F16K 31/56* | (2006.01) | |
| *F16K 31/524* | (2006.01) | |
| *F16K 11/00* | (2006.01) | |

(52) U.S. Cl.
CPC ............ *F16K 11/18* (2013.01); *F16K 19/006* (2013.01); *F16K 31/52483* (2013.01); *F16K 31/563* (2013.01); *Y10T 137/86549* (2015.04)

(58) Field of Classification Search
CPC ........... Y10T 137/86549; F16K 19/006; F16K 11/18; F16K 31/52483; F16K 31/563
See application file for complete search history.

(56) References Cited

U.S. PATENT DOCUMENTS

| 3,220,695 A | * | 11/1965 | Jones | .............. E03C 1/2306 |
| | | | | 251/263 |
| 3,238,968 A | * | 3/1966 | Pecis | ............... F16K 31/60 |
| | | | | 137/556 |
| 3,763,875 A | | 10/1973 | Möbus et al. | |
| 4,478,249 A | * | 10/1984 | Fleischmann | ......... F16K 11/078 |
| | | | | 137/454.6 |
| 4,784,180 A | | 11/1988 | Sieberhagen | |
| 5,052,438 A | | 10/1991 | Wang | |
| 8,631,823 B2 | | 1/2014 | Heerklotz | |
| 2010/0193721 A1 | | 8/2010 | Melle | |

(Continued)

FOREIGN PATENT DOCUMENTS

| CN | 104271998 A | 1/2015 |
| CN | 106461117 A | 2/2017 |
| DE | 1750380 A1 | 2/1971 |

(Continued)

OTHER PUBLICATIONS

Search Report issued by the European Patent Office, Munich Germany, dated May 20, 2019, for European Patent Application No. 18210439.8.

(Continued)

*Primary Examiner* — Craig M Schneider
*Assistant Examiner* — Kevin R Barss
(74) *Attorney, Agent, or Firm* — Faegre Drinker Biddle & Reath LLP (57) ABSTRACT

A valve actuation device for actuating a valve, such as a sanitary valve, in an axial actuation movement for a first valve function, illustratively a shut-off function, and in a rotary actuation movement for a second valve function, illustratively a quantity regulation or mixing function, and to a sanitary valve equipped with such a valve actuation device.

10 Claims, 4 Drawing Sheets

(56) References Cited

U.S. PATENT DOCUMENTS

2015/0097128 A1    4/2015  Herrmann
2016/0327175 A1  11/2016  Thurau

FOREIGN PATENT DOCUMENTS

| DE | 2147187 A1 | 4/1973 |
| --- | --- | --- |
| DE | 2232058 A1 | 1/1974 |
| DE | 3741854 A1 | 9/1988 |
| DE | 3730816 A1 | 3/1989 |
| DE | 202016001106 U1 | 5/2017 |
| EP | 2213918 A1 | 8/2010 |
| EP | 2195564 B1 | 5/2011 |
| GB | 927682 A | 6/1963 |
| RU | 2002114905 A | 1/2019 |
| SU | 440521 A1 | 8/1974 |

OTHER PUBLICATIONS

Office Action issued by the German Patent and Trademark Office, Munich, Germany, dated Apr. 26, 2019, for German Patent Application No. 102017222196.8.

Grohe Smart Design, Publication of Grohe AG:XP-002790682; Mar. 30, 2017.

Search Report and Decision to Grant in Russian language with English translation issued by the Federal Service for Intellectual Property, Patents and Trademarks (ROSPATENT), dated Aug. 19, 2019, for Russian Patent Application No. 2018142851/06(071401).

First Office Action issued by the National Intellectual Property Administration, P.R. China, dated Oct. 9, 2019 for Chinese Patent Application No. 201811495689 (in Chinese language with English translation).

\* cited by examiner

VALVE ACTUATION DEVICE AND SANITARY RULE

CROSS-REFERENCE TO RELATED APPLICATION

This application claims priority to German Patent Application No. DE 10 2017 222 196.8, filed on Dec. 7, 2017, the disclosure of which is expressly incorporated herein by reference.

BACKGROUND AND SUMMARY OF THE DISCLOSURE

The invention relates to a valve actuation device for actuating a valve, in particular a sanitary valve, in an axial actuation movement for a first valve function, in particular a shut-off function, and in a rotary actuation movement for a second valve function, in particular a quantity regulation or mixing function, and to a sanitary valve equipped with such a valve actuation device.

Valves which have both a shut-off function and a quantity regulation or mixing function are used for example in the sanitary sector. In the present case, "shut-off function" is to be understood here as meaning that the delivery of a corresponding fluid, such as water, at a corresponding valve outlet can selectively be enabled or shut off, typically completely shut off. This shut-off function is therefore often referred to as an "on/off function" of the valve. "Quantity regulation function" is to be understood as meaning that, by way of the respective valve function, the quantity of delivered fluid can be regulated, that is to say can be set in a variable manner to different throughflow rates between the value zero and a maximum value or a maximum fluid throughflow rate of the valve, typically in the form of stepless quantity regulation. "Mixing function" is to be understood as meaning that, by way of the valve function, two separately supplied fluids, such as cold water and hot water, can be mixed in variably settable proportions for the purpose of providing a corresponding mixed fluid. In this case, the mixing function may be a pure mixing function without additional quantity regulation or alternatively may be a mixing function for which, in addition to the mixing proportions of the fluids involved, the total quantity of mixed fluid is also able to be regulated, that is to say is able to be set in a variable and preferably stepless manner.

For valves of this type, it is known to use two separate operating elements for the shut-off function on the one hand and for the quantity regulation or mixing function on the other hand, the elements, for this purpose, acting as a user interface, that is to say in each case as that element which is gripped or in some other way directly handled by the user for the purpose of effecting the respective function. In a large number of cases, the valve actuation for the shut-off function comprises an axial actuation movement and for the quantity regulation or mixing function comprises a rotary actuation movement. In alternative embodiments of corresponding valve actuation devices, the axial actuation movement may be responsible for the quantity regulation or mixing function and the rotary actuation movement may be responsible for the shut-off function, and in further alternative embodiments, it is also possible for the two actuation movements to be associated with two different other common valve functions.

It is an object of the invention to provide a valve actuation device of the type mentioned in the introduction, by way of which a valve can be actuated at least in an axial actuation movement for a first valve function and in a rotary actuation movement for a second valve function with a high level of operating convenience and a high level of functional reliability and which is able to be realized with relatively little effort, and a sanitary valve equipped with such a valve actuation device.

An illustrative embodiment of the invention achieves this and other objects through the provision of a valve actuation device including a rotation transmission body which is connectable to a rotary actuation member of the valve, an operating element, rotationally and axially movable in a combined manner, acting as a user interface, which operating element is coupled to the rotation transmission body rotationally fixed and axially moveable and has a self-retaining initial position, a forward end position axially ahead of the initial position and a self-retaining rearward end position axially behind the initial position, wherein by advancing the operating element to the forward end position the first valve function is activated and by turning the operating element the second valve function is activated, an elastic biasing element which biases the operating element axially in the direction towards the rearward end position, a locking slide body which is connectable to an axial actuation member of the valve for rotational movement and axially fixed, and which comprises a locking device, offset in the rotational direction, for retaining the operating element in the initial position, and an axial sliding link for enabling an axial movement of the operating element towards the rearward end position, and a rotary sliding link mechanism) operative between the operating element and the locking slide body for turning the locking slide body during advancing of the operating element towards the forward end position.

A further illustrative embodiment of the invention provides a sanitary valve having at least one of a quantity regulation and a shut-off function, the sanitary valve including a valve cartridge including a rotary actuation member for effecting the at least one of quantity regulation or mixing function and comprising an axial actuation member for effecting the shut-off function. The illustrative sanitary valve further includes a valve actuation device being attached to the valve cartridge and configured to actuate the valve in an axial actuation movement for a first valve function and in a rotary actuation movement for a second valve function, the valve actuation device comprising a rotation transmission body which is connectable to the rotary actuation member of the valve; an operating element, rotationally and axially movable in a combined manner, acting as a user interface, which operating element is coupled to the rotation transmission body rotationally fixed and axially moveable and has a self-retaining initial position, a forward end position axially ahead of the initial position and a self-retaining rearward end position axially behind the initial position, wherein by advancing the operating element to the forward end position the first valve function is activated and by turning the operating element the second valve function is activated; an elastic biasing element which biases the operating element axially in the direction towards the rearward end position; a locking slide body which is connectable to the axial actuation member of the valve for rotational movement and axially fixed, and which comprises a locking device, offset in the rotational direction, for retaining the operating element in the initial position, and an axial sliding link for enabling an axial movement of the operating element towards the rearward end position; and a rotary sliding link mechanism) operative between the operating element and the locking slide body for turning the locking slide body during advancing of the operating element towards the forward end position.

The valve actuation device according to an illustrative embodiment of the invention comprises an operating element, rotationally and axially movable in a combined manner, acting as a user interface, which operating element is coupled to a rotation transmission body in a manner rotationally conjoint and axially movable, the body being connectable to a rotary actuation member of the valve. The operating element has a self-retaining initial position, a forward end position axially ahead of the initial position, and a self-retaining rearward end position axially behind the initial position. The first valve function is activated by axially advancing the operating element to the forward end position, and the second valve function is activated by turning the operating element. In advantageous embodiments, the turning is realized about an axis of rotation which is parallel to the axial direction, and, in alternative embodiments, about an axis of rotation which is not parallel to the axial direction. An elastic biasing element biases the operating element axially in the direction towards the rearward end position.

A locking slide body is connectable to an axial actuation part of the valve in a rotationally movable and axially fixed manner and has a locking device for retaining the operating element in the initial position and an axial sliding link for enabling an axial movement of the operating element into the rearward end position, wherein the locking device and the axial sliding link are arranged offset from one another in the direction of rotation of the locking slide body. A rotary sliding link mechanism acting between the operating element and the locking slide body serves for turning the locking slide body during the advancement of the operating element into its forward end position.

The invention thus provides a valve actuation device, which is able to be operated by the user with a high level of operating convenience, for actuation of a corresponding valve to activate in each case one of two valve functions, the valve having two or more valve functions. For this purpose, the handling by the user of just one operating element is sufficient. By axially advancing the operating element into its forward end position, the user is able to activate the first valve function, for example open up or shut off a valve outlet, and by turning the same operating element, the user is able to activate the second valve function, for example setting in a variable, in particular stepless, manner the quantity and/or the mixing ratio for a fluid delivered by the valve.

Advantageously, the operating element has two self-retaining positions situated at different axial levels, firstly the initial position and secondly the rearward end position, which is axially retracted in relation thereto. In the initial position, the element can be aligned advantageously, for example in an optical sense or for reasons of design, with a surrounding surface, for example a sanitary fitting or some other fixture in which the valve actuation device is installed. In the rearward end position, axially retracted in comparison therewith, the element can then be conveniently gripped by the user in order, by way of turning, to activate the second valve function. From the self-retaining initial position, the operating element can firstly be brought into the axially advanced forward end position by the user by pushing it axially forwards, from which end position it can then pass into the rearward end position under the action of the elastic biasing element. This functional principle is similar to that of conventional, lowerable baking oven rotary knobs with the difference that, there, the axial pushing-forwards of the operating knob does not trigger an operating function but only serves for the disengagement from the self-retaining initial position, whereas, in the present case, the first valve function is activated by the axial advancement of the operating element into the forward end position.

The locking slide body ensures disengageable self-retaining of the operating element in the initial position. Advancing the operating element into the forward end position allows the locking to be released, and the rotary sliding link mechanism allows the locking slide body to be turned in relation to the operating element such that the axial sliding link of the locking slide body then enables axial retraction of the operating element into the rearward end position.

By pushing axially forwards again, the user can push the operating element forwards into the forward end position from the self-retaining rearward end position and again activate the first valve function. Moreover, the rotary sliding link mechanism can at the same time again turn the locking slide body in relation to the operating element, as a result of which the axial sliding link passes out of engagement with the operating element and instead the locking device comes into engagement with the operating element, with the result that the operating element subsequently passes into the self-retaining initial position, defined by the locking device, under the action of the elastic biasing element again when the user releases the operating element.

Overall, the valve actuation device according to the invention thus results in a high level of operating convenience for the user, and the valve actuation device is able to be realized with relatively little production effort and/or few components.

In one refinement of the invention, the locking slide body is configured as a locking slide sleeve having a sleeve lateral surface, on which the locking device and the axial sliding link are formed, with which at least one corresponding locking/sliding link element of the operating element cooperates. This constitutes a realization of the locking slide body that is advantageous in terms of function and in terms of production technology. In one advantageous embodiment, the locking slide body is produced as an integral component.

In corresponding configurations of the invention, the locking device is formed by a face end region of at least one axial web projecting radially on the sleeve lateral surface, preferably by a face end region of multiple axial webs spaced apart from one another in the sleeve circumferential direction, and/or the axial sliding link is formed by at least one axial recess in the sleeve lateral surface, preferably by multiple recesses spaced apart from one another in the sleeve circumferential direction. The respective recess may be groove, or a slot which radially penetrates the sleeve lateral surface. The arrangement of in each case multiple axial webs and/or axial recesses on the circumference of the sleeve shell can promote stability and guidance behaviour for the cooperation of the locking slide sleeve with the operating element.

In one refinement of the invention, the locking slide body is in the form of a locking slide sleeve which has, on an end face, a bevel profile as a locking body-side part of the rotary sliding link mechanism, wherein a counterface profile on the operating element, as an operating element-side part of the rotary sliding link mechanism, cooperates with the bevel profile. This constitutes a realization of the rotary sliding link mechanism that is advantageous in terms of construction.

In one refinement of the invention, the locking slide body is in the form of a locking slide sleeve and the rotation transmission body is in the form of a rotation transmission sleeve, these being arranged co-axially with respect to one another. This measure has advantages in terms of construction and function. It is thus possible, according to requirement, for the rotation transmission sleeve to be used as a coaxial guide for the locking slide sleeve, which is movable in relation to the rotation transmission sleeve.

In one refinement of the invention, the valve actuation device has, between the locking slide body and the rotation transmission body, an anti-twist arrangement which enables turning of the locking slide body in relation to the rotation transmission body only in a specific position of the operating element, namely only when the axial distance of the operating element from its forward end position, that is to say its maximum position of axial advancement, falls below a pre-determinable enabling distance. The enabling distance is expediently selected to be less than the axial distance between the initial position and the forward end position of the operating element, and specifically, in corresponding embodiments, the enabling distance is selected to be so small that the locking slide body is released for turning in relation to the rotation transmission body, and thus also in relation to the operating element, which is coupled to the rotation transmission body in a rotationally conjoint manner, only if the first valve function has been activated beforehand by way of the axial advancement of the operating element.

In one configuration of the invention which is advantageous in terms of construction, the anti-twist arrangement comprises at least one blocking web, which protrudes radially on the rotation transmission body and extends in the axial direction, and at least one blocking lug, which cooperates therewith and protrudes radially on the locking slide body. In corresponding realizations, the blocking web protrudes radially inwardly on the rotation transmission body and the blocking lug protrudes radially outwardly on the locking slide body, or alternatively the blocking web protrudes radially outwardly on the rotation transmission body and the blocking lug protrudes radially inwardly on the locking slide body.

The sanitary valve according to the invention comprises a valve cartridge having a rotary actuation member for effecting a quantity regulation or mixing function and having an axial actuation member for effecting a shut-off function. Additionally, the valve is equipped with the valve actuation device according to the invention which is attached to the valve cartridge, so that the sanitary valve can be used in a convenient manner by the user. The sanitary valve is in particular suitable for installation into a sanitary fitting or some other sanitary item such that the operating element is, in its initial position, aligned with a surface, surrounding the operating element, of the sanitary fitting or of the sanitary item or with some other surrounding installation surface or installation wall. In this position, the operating element can be pushed axially forwards by the user. After reaching its axially retracted rearward end position, the element correspondingly projects in relation to the surrounding surface and can be gripped by the user for the purpose of carrying out the rotary actuation. Subsequently, the element can be pushed axially forwards again and brought back into its initial position.

Additional features and advantages of the present invention will become apparent to those skilled in the art upon consideration of the following detailed descriptions of the illustrative embodiment best exemplifying the best mode of carrying out the invention as presently perceived.

BRIEF DESCRIPTION OF THE DRAWINGS

Advantageous embodiments of the invention are illustrated in the drawings and will be described below. In the drawings.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
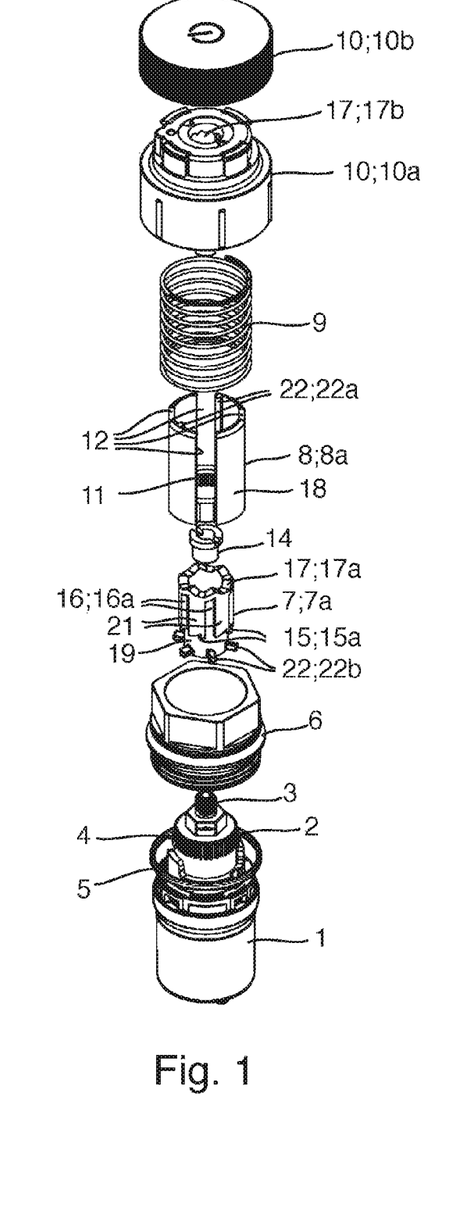
FIG. 1 shows a perspective exploded view obliquely from above of a sanitary valve, with a valve cartridge and valve actuation device.
Figure 2:
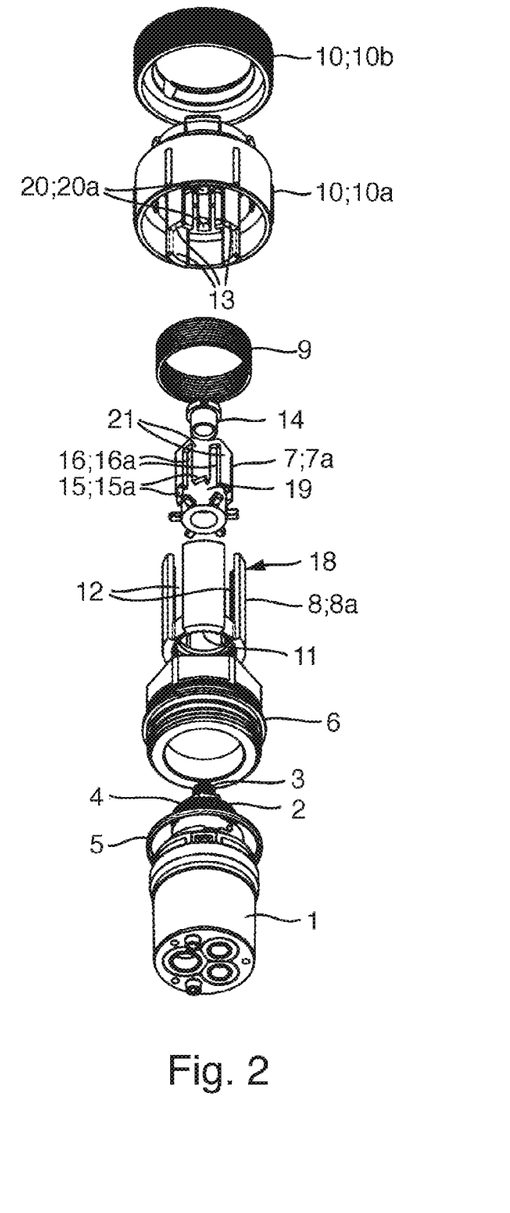
FIG. 2 shows a perspective exploded view obliquely from below of the sanitary valve in FIG. 1.

The sanitary valve illustrated in the exploded views in FIGS. 1 and 2 has a shut-off function and a quantity regulation or mixing function and, for this purpose, comprises a valve cartridge 1 of a conventional type of construction having a rotary actuation member 2 for effecting the quantity regulation or mixing function and having an axial actuation member 3 for effecting the shut-off function. The rotary actuation member 2 may for example be a rotary sleeve which is rotationally movable about a longitudinal axis of the valve cartridge 1 and which has an outer toothed ring 4, and the axial actuation member 3 may for example be a pressure actuation pin which is axially movable along the longitudinal axis of the valve cartridge. In the example shown, the rotary actuation member 2 and the axial actuation member 3 are arranged on an end face of a cylindrical housing of the valve cartridge 1, and onto the end face it is possible for a tensioning screw 6 to be screwed with interposition of a seal 5.

A valve actuation device, which, in the example shown, is able to be mounted onto the end face of the valve cartridge 1, serves for the actuation of the valve. The valve actuation device comprises a locking slide body 7, a rotation transmission body 8, an elastic biasing element 9 and an operating element 10. The operating element 10 comprises a main body 10a and a grip shell 10b which is able to be snapped onto the main body.

The rotation transmission body 8 is able to be connected to the rotary actuation member 2 of the valve in a rotationally conjoint manner. In the example shown, the rotation transmission body 8 has, for this purpose, an inner toothed ring 11 which is able to be mounted onto the outer toothed ring 4 of the rotary actuation member 2 in a rotationally conjoint manner; alternatively, it is possible for use to be made of some other conventional rotationally conjoint connection. Preferably, the rotation transmission body 8 is formed in one piece.

Figures 3, 4, 5:
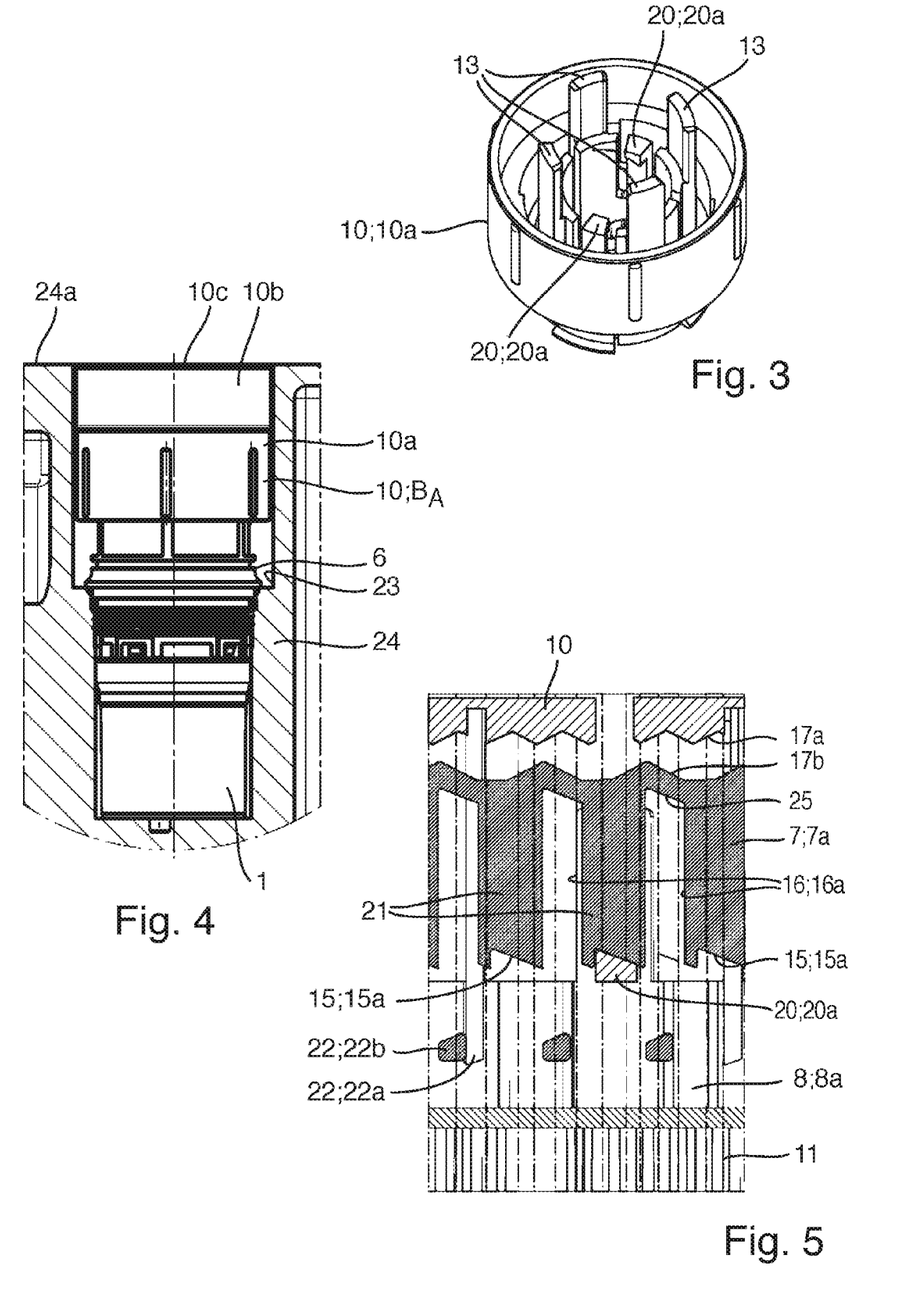
FIG. 3 shows a perspective view obliquely from below of an operating element of the valve actuation device in FIG. 1.
FIG. 4 shows a side view of the sanitary valve in FIG. 1 in the installed state, with the operating element in a self-retaining initial position.
FIG. 5 shows a longitudinal sectional view of one part of the valve actuation device in FIG. 1, with the operating element in the self-retaining initial position.

The operating element 10 acts as a user interface, which is able to be handled directly by the user, and is arranged so as to be rotationally and axially movable in a combined manner and, in this case, is coupled to the rotation transmission body 8 in a rotationally conjoint and axially movable manner. In the example shown, this coupling is realized by at least one axial slot 12 in the rotation transmission body 8 and at least one corresponding rotary driving web 13, which extends in the axial direction on the operating element 10 and engages into the axial slot of the rotation transmission body 8. Preferably, multiple axial slots 12 which are arranged spaced apart in a circumferential direction are formed on the rotation transmission body 8, and a corresponding number of corresponding rotary driving webs 13 are formed on the operating element, for example in each case four. During an axial movement of the operating element 10, the respective rotary driving web 13 is able to be moved in the associated axial slot 12, with the rotation transmission body 8 remaining stationary, while a rotational movement of the operating element 10 effects, via the cooperation of the rotary driving web(s) 13 with the axial slot(s) 12, a corresponding rotation of the rotation transmission body 8.

The main body 10a is preferably formed in one piece and, in this embodiment variant, forms, together with the mounted grip shell 10b, the operating element 10 as an integral component, which is able to be axially moved or turned by the user in order to activate the aforementioned valve functions.

Figure 8:
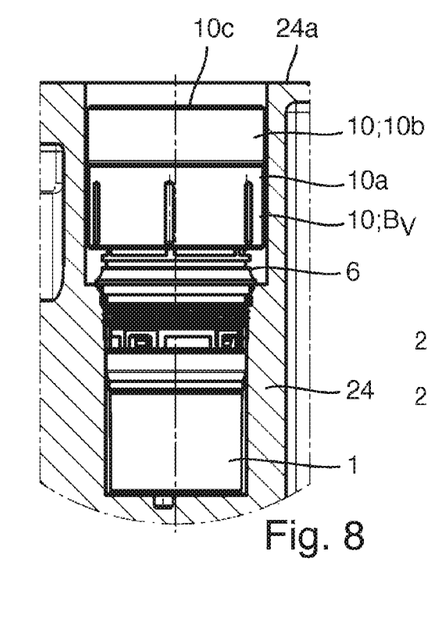
FIG. 8 shows the view in FIG. 4 with the operating element in its forward end position.
Figure 11:
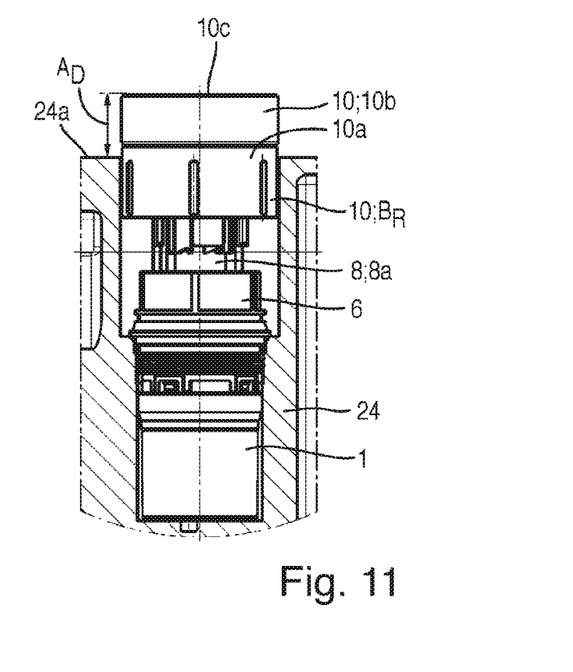
FIG. 11 shows the view in FIG. 4 with the operating element in its self-retaining rearward end position.
Figure 12:
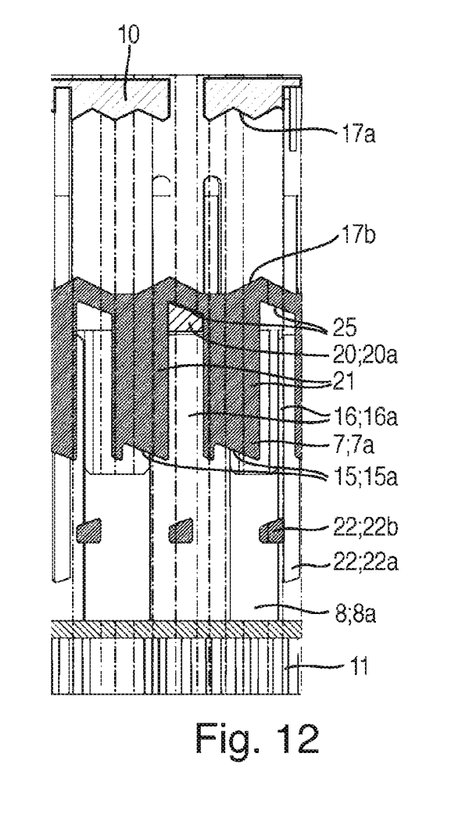
FIG. 12 shows the sectional view in FIG. 5 with the operating element in its rearward end position.

The operating element 10, which is rotationally and axially movable in a combined manner, has a self-retaining initial position $B_A$, a forward end position $B_V$ axially ahead of the initial position $B_A$ and a self-retaining rearward end position $B_R$ axially behind the initial position $B_A$. FIGS. 4, 8 and 11 show the sanitary valve in an exemplary installation situation with the operating element in the initial position $B_A$, in the forward end position $B_V$ and in the rearward end position $B_R$, respectively. The elastic biasing element 9, which may for example be a spring such as a helical compression spring, biases the operating element 10 axially in the direction of the rearward end position $B_R$.

The locking slide body 7 is able to be connected to the axial actuation member 3 of the valve in a rotationally movable and axially fixed manner. For this purpose, use may be made of any connection means which are familiar for this purpose to a person skilled in the art. Serving for this purpose in the example shown is a positioning screw 14 which can be screwed onto the axial actuation member 3 of the valve and which, by way of an annular flange, retains the locking slide body 7 on the axial actuation member 3 in a rotationally movable and axially fixed manner. Preferably, the locking slide body 7 is formed in one piece.

The locking slide body 7 has a locking device 15 for retaining the operating element 10 in the initial position $B_A$ and has an axial sliding link 16 for enabling an axial movement of the operating element 10 into the rearward end position $B_R$.

A rotary sliding link mechanism 17 acts between the operating element 10 and the locking slide body 7 in order to turn the locking slide body 7 during the axial advancement of the operating element 10 into the forward end position $B_V$.

In corresponding embodiments, the locking slide body 7 is, as in the example shown, configured as a locking slide sleeve 7a having a sleeve lateral surface 19, on which the locking device 15 and the axial sliding link 16 are formed, with which at least one corresponding locking/sliding link element 20 of the operating element 10 cooperates. In the example shown, the locking device 15 is formed by a face end region 15a, shaped as a detent, of at least one axial web 21 projecting radially on the sleeve lateral surface 19.

Preferably, multiple radially projecting axial webs 21a having associated face end regions 15a, formed as locking means, are formed on the sleeve lateral surface 19 so as to be spaced apart from one another in the circumferential direction. Also, the axial sliding link 16 is preferably formed by multiple axial recesses 16a in the sleeve lateral surface 19, which recesses are arranged spaced apart from one another in the circumferential direction.

In corresponding embodiments, the locking slide body 7 is in the form of a locking slide sleeve 7a, and the rotation transmission body 8 is in the form of a rotation transmission sleeve 8a which is arranged co-axially with respect to the locking slide sleeve 7a. In this regard, in the exemplary embodiment shown, the locking slide sleeve 7a is, with its lateral surface 19, received co-axially in a lateral surface 18 of the rotation transmission sleeve 8a.

In corresponding embodiments, the locking slide sleeve 7a has, on an end face, a bevel profile 17a as a locking body-side part of the rotary sliding link mechanism 17. Matching this, the operating element 10 then has a counterface profile 17b as an operating element-side part of the rotary sliding link mechanism 17, which counterface profile cooperates with the bevel profile 17a.

In corresponding embodiments, the valve actuation device has, as in the example shown, an anti-twist arrangement 22 which acts between the locking slide body 7 and the rotation transmission body 8 and which enables turning of the locking slide body 7 in relation to the rotation transmission body 8 only when the axial distance of the operating element 10 from its forward end position $B_V$ falls below a pre-determinable enabling distance. In advantageous embodiments, the enabling distance is predetermined such that turning of the locking slide body 7 in relation to the rotation transmission body 8 is enabled only when the operating element 10 has approached its forward end position $B_V$ to such an extent that the associated first valve function has been activated.

As shown, the anti-twist arrangement 22 may be realized for example by at least one blocking web 22a, which protrudes radially on the rotation transmission body 8 and extends axially, and at least one blocking lug 22b, which cooperates in a manner corresponding therewith and protrudes radially on the locking slide body 7. In the exemplary embodiment shown, the rotation transmission body 8 has multiple, for example two, radially inwardly protruding blocking webs 22a arranged spaced apart in the circumferential direction, while multiple, for example six, radially outwardly protruding blocking lugs 22b are formed on the locking slide body 7. With stepwise turning of the locking slide body 7 in relation to the rotation transmission body 8, at least in each case one of the blocking lugs 22b comes into abutment against at least one of the blocking webs 22a, for example in each case one blocking lug 22b comes into abutment in an alternating manner against in each case one of two blocking webs 22a, in order thereby to provide the desired anti-twist action.

The functioning of the valve actuation device shown will be discussed below with reference in particular to FIGS. 4 to 12, for which purpose reference is made, by way of example, to an installation situation in which the sanitary valve has, with the valve cartridge 1 and the valve actuation device mounted thereon, been inserted into a valve receptacle opening 23 of a surrounding wall 24 having a front-side visible surface 24a.

FIGS. 4 and 5 show the inserted sanitary valve, with the operating element 10 in its self-retaining initial position $B_A$. In the initial position $B_A$, a front side 10c of the operating element 10 is preferably aligned with the front-side visible surface 24a of the surrounding wall 24. In the initial position $B_A$, the locking/sliding link element 20 of the operating element 10 cooperates with the locking device 15 in that the respective locking lug 20a engages in a locking manner into the face end region 15a of the associated axial web 21. This locking secures the operating element 10 against axial retraction in relation to the locking slide body 7 which, for its part, is connected in an axially fixed manner to the axial actuation member 3 of the valve. The axial actuation member 3 of the valve is in this case situated in its position of maximum axial retraction. In this axial position of the locking slide body 7, the anti-twist arrangement 22 also acts in that at least one of the blocking lugs 22b comes into abutment against one of the blocking webs 22a, as a result of which inadvertent turning of the locking slide body 7 is reliably prevented. In the initial position $B_A$ of the operating element 10, the rotary sliding link mechanism 17 is inactive since the counterface profile 17b of the operating element 10 is spaced apart axially from the bevel profile 17a of the locking slide body 7.

When the operating element 10 is pushed out of the initial position $B_A$ in an axially forward direction by the user, the locking/sliding element 20 of the operating element 10 starts to disengage from the locking device 15 and the counterface profile 17b approaches the bevel profile 17a, as a result of which the rotary sliding link mechanism 17 is activated.

Figure 6:
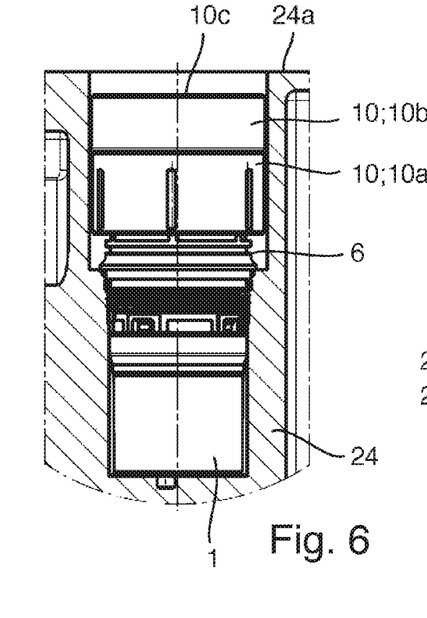
FIG. 6 shows the view in FIG. 4 with the operating element in a pushed-in intermediate position.
Figure 7:
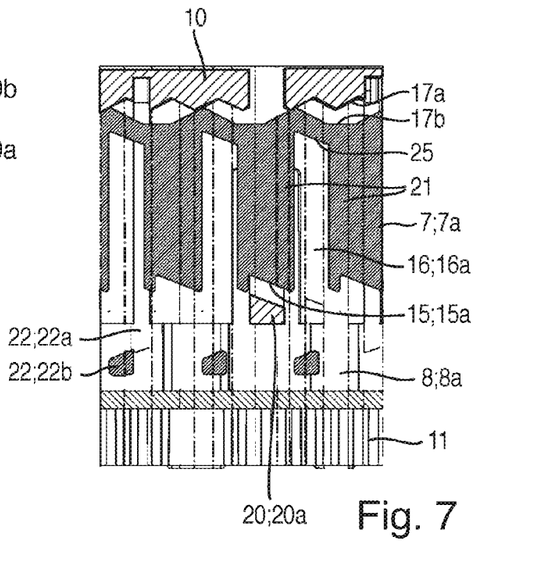
FIG. 7 shows the sectional view in FIG. 5 with the operating element in the pushed-in intermediate position.

FIGS. 6 and 7 show the situation in a pushed-in intermediate position of the operating element 10 between its initial position $B_A$ and its forward end position $B_V$, wherein, in the intermediate position, the locking/sliding link element 20a has just come free from the locking device 15 and the counterface profile 17b just comes into abutment against the bevel profile 17a. In the intermediate position, the anti-twist arrangement 22 is still active since the operating element 10 has not yet approached its forward end position $B_V$ axially up to the predetermined enabling distance. Therefore, further axial pushing-forward of the operating element 10 by the user leads to the operating element 10 then pushing the locking slide body 7 axially forwards. As a result, the axial actuation member 3 of the valve is pushed axially forwards, that is to say in the direction into the valve cartridge 1, as a result of which the first valve function is activated. In this case, this may for example be a shut-off function by way of which the previously closed valve is opened.

As soon as the operating element 10 has then approached its forward end position $B_V$ up to the predetermined enabling distance, the anti-twist arrangement 22 is released and turning of the locking slide body 7 in relation to the rotation transmission body 8 is thus enabled. To this end, the at least one blocking web 22a ends, in the axial forward direction, at an axial height which is exceeded by the at least one blocking lug 22b if the operating element 10 has advanced the locking slide body 7 axially to a corresponding extent. Following the release of the anti-twist arrangement 22, the rotary sliding link mechanism 17 then acts with its corresponding bevel surfaces 17a, 17b, as a result of which the locking slide body 7 is turned in relation to the operating element 10, which is not driven in rotation owing to its rotationally rigid coupling to the rotation transmission sleeve 8.

Figure 9:
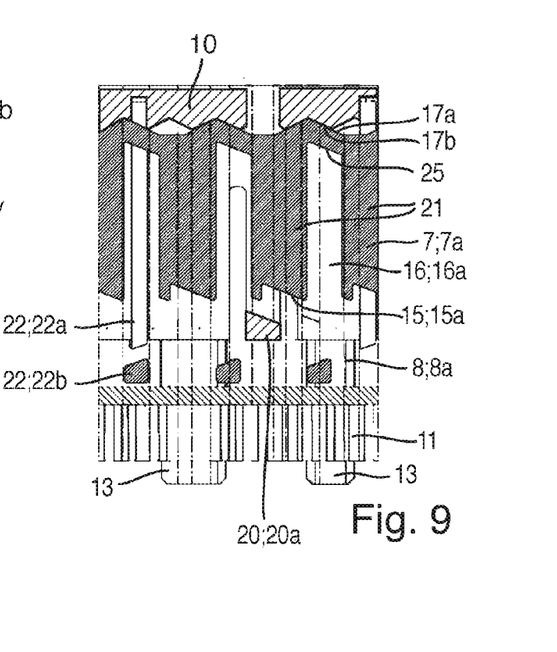
FIG. 9 shows the sectional view in FIG. 5 with the operating element in the forward end position.
Figure 10:
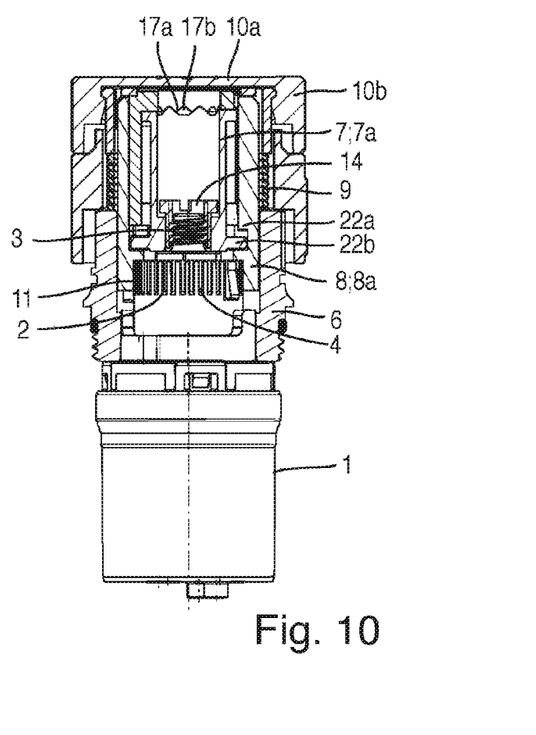
FIG. 10 shows a longitudinal sectional view of the sanitary valve in FIG. 1, with the operating element in its forward end position.

FIGS. 8 and 9 show the situation when the operating element 10 has in this way been advanced axially into its forward end position $B_V$. The locking slide body 7 has rotated further through an angle which is sufficient that, during the subsequent axial retraction of the operating element 10, the locking/sliding link element 20 of the operating element 10 no longer passes back into the locking device 15 for retaining the operating element 10 in the initial position $B_A$, but passes into the axial sliding link 16, which is offset in relation to the locking device 15 in the direction of rotation, wherein the passing of the locking/sliding link element 20 into the axial sliding link 16 may be accompanied by further turning of the locking slide body 7, as can be seen in the example shown, for example based on a comparison of FIGS. 9 and 12. This additional turning is realized with the release of the rotary sliding link mechanism 17 during the axial retraction of the operating element 10 and results in the bevel profile 17a of the locking slide body 7 being turned correspondingly further in relation to the counterface profile 17b on the operating element 10. Consequently, the rotary sliding link mechanism 17 is made capable of acting on the locking slide body 7 so as to cause further turning again during the next axial advancement of the operating element 10.

In order to effect the additional turning, it is possible in the example shown, as can be seen from FIGS. 8 and 9, for the locking/sliding link element 20, during the axial retraction of the operating element 10, to turn the locking slide body 7, for example as a result of corresponding bevel shaping on the locking/sliding link element 20 on the one hand and on the locking device 15 or the axial web face end region 15a on the other hand, to such an extent that the locking/sliding link element 20 passes into the axial sliding link 16 as soon as the rotary sliding link mechanism 17 has been released, with the anti-twist arrangement 22 still released. Subsequently, the biasing element 9 can push the operating element 10 axially further back in relation to the locking slide body 7 and the rotation transmission body 8, wherein the locking/sliding link element 20 is guided or slides along in the axial sliding link 16 until the operating element 10 has reached its rearward end position $B_R$, shown in FIGS. 11 and 12.

The rearward end position $B_R$ may be defined for example in that the locking/sliding link element 20 of the operating element 10 comes into abutment against an end stop 25 of the axial sliding link 16 on the locking slide body 7. As can be seen from FIG. 11, the operating element 10 projects in its rearward end position $B_R$ by a rotary actuation distance $A_D$ with respect to the surrounding front surface 24a, the distance allowing the user then to grip the operating element 10 circumferentially, and to turn it, in order to activate or carry out the second valve function. By selecting a corresponding axial length of the axial sliding link 16 of the locking slide body 7, for example, the rotary actuation distance $A_D$ may be selected to be of a suitable magnitude such that the user is able to grip and rotate the operating element 10 circumferentially in a reliable and convenient manner, for example with the fingers of one hand. For example, it is possible by way of this second valve function for the user to set in a variable manner, for example in a stepless manner or alternatively in multiple steps, the mixing ratio of two fluids, such as cold water and hot water, and/or the quantity of fluid delivered by the valve.

If the user subsequently wishes to shut off the valve again or to bring the operating element 10 into its initial position $B_A$, the user merely needs to push the operating element 10 axially forwards into its forward end position $B_V$ again for this purpose. This triggers the first valve function and thus, for example, the shut-off of the valve, and at the same time, by release of the anti-twist arrangement 22 and the activation of the rotary sliding link mechanism 17, the locking slide body 7 is turned further into its next rotary position relative to the operating element 10 and to the rotation transmission body 8. After the user releases the operating element, the operating element 10 then passes into its self-retaining initial position $B_A$ again in that, as a result of the further turning of the locking slide body 7, the locking/sliding link element 20 of the operating element no longer passes back into the axial sliding link 16 but rather cooperates in a locking manner with the locking device 15 again.

As is clear from the exemplary embodiments shown and explained above, the invention provides an advantageous valve actuation device by way of which a valve can be actuated in an axial actuation movement for a first valve function and in a rotary actuation movement for a second valve function with a high level of operating convenience and functional reliability. Use of the valve actuation device is advantageously possible with corresponding sanitary valves, use thereof being possible in the same way however for any desired other valves with which an axial actuation movement for a first valve function and a rotary actuation movement for a second valve function are necessary. The valve actuation device requires just a single specifically rotationally and axially movable operating element, which is able to be moved as a whole by the user, two operating elements to be moved independently of one another not therefore being necessary for the carrying-out of the two valve functions.

Although the invention has been described in detail with reference to certain preferred embodiments, variations and modifications exist within the spirit and scope of the invention as described and defined in the following claims.

The invention claimed is:

1. A valve actuation device for actuating a valve in an axial actuation movement for a first valve function and in a rotary actuation movement for a second valve function, the valve actuation device comprising:
   a rotation transmission body which is connectable to a rotary actuation member of the valve;
   an operating element, rotationally and axially movable in a combined manner, acting as a user interface, which operating element is coupled to the rotation transmission body rotationally fixed and axially moveable and has a self-retaining initial position, a forward end position axially ahead of the initial position and a self-retaining rearward end position axially behind the initial position, wherein by advancing the operating element to the forward end position the first valve function is activated and by turning the operating element the second valve function is activated;
   an elastic biasing element which biases the operating element axially in the direction towards the rearward end position;
   a locking slide body which is connectable to an axial actuation member of the valve for rotational movement and axially fixed, and which comprises a locking device, offset in the rotational direction, for retaining the operating element in the initial position, and an axial sliding link for enabling an axial movement of the operating element towards the rearward end position; and
   a rotary sliding link mechanism) operative between the operating element and the locking slide body for turning the locking slide body during advancing of the operating element towards the forward end position.

2. The valve actuation device according to claim 1, wherein the locking slide body is configured as a locking slide sleeve having a sleeve lateral surface, on which the locking device and the axial sliding link are provided, with which at least one corresponding locking/sliding link element of the operating element cooperates.

3. The valve actuation device according to claim 2, wherein the locking device is formed by a face end region of at least one axial web radially projecting from the sleeve lateral surface and/or the axial sliding link is formed by at least one axial recess in the sleeve lateral surface.

4. The valve actuation device according to claim 1, wherein the locking slide body is in the form of a locking slide sleeve which has a bevel profile on an end face as a locking body-related part of the rotary sliding link mechanism, and the operating element has a counterface profile cooperating with the bevel profile as an operating element-related part of the rotary sliding link mechanism.

5. The valve actuation device according to claim 1, wherein the locking slide body is in the form of a locking slide sleeve and the rotation transmission body is in the form of a rotation transmission sleeve which is arranged coaxially to the locking slide sleeve.

6. The valve actuation device according to claim 1, wherein an anti-twist arrangement is provided between the locking slide body and the rotation transmission body, to enable turning of the locking slide body in relation to the rotation transmission body only in case that the axial distance of the operating element from its forward end position goes below a pre-determinable enabling distance.

7. The valve actuation device according to claim 6, wherein the anti-twist arrangement comprises at least one axially extending blocking web radially protruding from the rotation transmission body and at least one blocking lug radially protruding from the locking slide body and correspondingly cooperating with the blocking web.

8. The valve actuation device according to claim 1, wherein the first valve function is a shut-off function.

9. The valve actuation device according to claim 1, wherein the second valve function is a quantity regulation function or a mixing function.

10. A sanitary valve having a shut-off function and at least one of a quantity regulation or mixing function, the sanitary valve comprising:
   a valve cartridge comprising a rotary actuation member for effecting the at least one of quantity regulation or mixing function and comprising an axial actuation member for effecting the shut-off function, and
   a valve actuation device being attached to the valve cartridge and configured to actuate the valve in an axial actuation movement for a first valve function and in a rotary actuation movement for a second valve function, the valve actuation device comprising:
   a rotation transmission body which is connectable to the rotary actuation member of the valve;

an operating element, rotationally and axially movable in a combined manner, acting as a user interface, which operating element is coupled to the rotation transmission body rotationally fixed and axially moveable and has a self-retaining initial position, a forward end position axially ahead of the initial position and a self-retaining rearward end position axially behind the initial position, wherein by advancing the operating element to the forward end position the first valve function is activated and by turning the operating element the second valve function is activated;

an elastic biasing element which biases the operating element axially in the direction towards the rearward end position;

a locking slide body which is connectable to the axial actuation member of the valve for rotational movement and axially fixed, and which comprises a locking device, offset in the rotational direction, for retaining the operating element in the initial position, and an axial sliding link for enabling an axial movement of the operating element towards the rearward end position; and a rotary sliding link mechanism) operative between the operating element and the locking slide body for turning the locking slide body during advancing of the operating element towards the forward end position.

* * * * *